United States Patent
Gubing et al.

(10) Patent No.: US 9,534,759 B2
(45) Date of Patent: Jan. 3, 2017

(54) LAMP ADJUSTER TO CONTROL MARGINS

(71) Applicant: Ford Global Technologies, LLC, Dearborn, MI (US)

(72) Inventors: William Francis Gubing, Plymouth, MI (US); Stephen Kenneth Helwig, Farmington Hills, MI (US); Sarbjit Singh, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 287 days.

(21) Appl. No.: 14/210,681

(22) Filed: Mar. 14, 2014

(65) Prior Publication Data

US 2015/0260363 A1    Sep. 17, 2015

(51) Int. Cl.
| | | |
|---|---|---|
| *B60Q 1/00* | (2006.01) | |
| *F21S 8/10* | (2006.01) | |
| *B60Q 1/068* | (2006.01) | |

(52) U.S. Cl.
CPC ......... *F21S 48/1742* (2013.01); *B60Q 1/0035* (2013.01); *B60Q 1/0683* (2013.01); *F21S 48/1757* (2013.01); *F21S 48/24* (2013.01)

(58) Field of Classification Search
CPC ..... B60Q 1/0035; B60Q 1/0683; F21V 14/04; F21V 14/00; F21S 48/1757; F21S 48/1742; F21S 48/24
See application file for complete search history.

(56) References Cited

U.S. PATENT DOCUMENTS

| | | | | |
|---|---|---|---|---|
| 4,739,223 A | * | 4/1988 | Baba | F21S 48/1757 315/82 |
| 5,138,532 A | * | 8/1992 | Shirai | B60Q 1/007 33/335 |
| 5,373,425 A | * | 12/1994 | Shirai | B60Q 1/0686 362/284 |
| 5,499,173 A | * | 3/1996 | Yamamoto | F21S 48/335 362/294 |
| 5,530,629 A | | 6/1996 | Uehara | |
| 5,678,916 A | * | 10/1997 | Watanabe | B60Q 1/007 362/265 |
| 5,707,133 A | * | 1/1998 | Burton | B60Q 1/0686 116/281 |
| 5,707,134 A | * | 1/1998 | Nishizawa | B60Q 1/0683 362/289 |
| 5,833,346 A | * | 11/1998 | Denley | B60Q 1/0686 33/288 |
| 6,161,950 A | * | 12/2000 | Tsukamoto | B60Q 1/1415 362/284 |

(Continued)

FOREIGN PATENT DOCUMENTS

| | | |
|---|---|---|
| EP | 887227 A2 | 12/1998 |
| JP | 2004303523 A | 10/2004 |
| KR | 20050005808 A | 1/2006 |

*Primary Examiner* — Anh Mai
*Assistant Examiner* — Fatima Farokhrooz
(74) *Attorney, Agent, or Firm* — Jason C. Rogers; Bejin Bieneman PLC

(57) ABSTRACT

A vehicle lamp assembly includes a body having a reflector, a lens, and a bulb. The assembly further includes a bezel, at least one adjuster arm attached to the body and to the bezel, and at least one biasing arm attached to the body and to the bezel. The biasing arm is configured to aim the reflector in accordance with movement of the adjuster arm while minimizing a gap between the bezel and the lens.

17 Claims, 4 Drawing Sheets

(56) References Cited

U.S. PATENT DOCUMENTS

| | | | |
|---|---|---|---|
| 6,234,655 B1* | 5/2001 | Suehiro | B60Q 1/076 362/515 |
| 6,260,993 B1* | 7/2001 | Ito | B60Q 1/0683 362/273 |
| 6,299,335 B1* | 10/2001 | Shirai | B60Q 1/06 362/514 |
| 7,264,376 B2 | 9/2007 | Burton | |
| 7,438,457 B2 | 10/2008 | Whynott | |
| 2001/0040810 A1* | 11/2001 | Kusagaya | B60Q 1/085 362/351 |
| 2001/0043474 A1* | 11/2001 | Kusagaya | B60Q 1/12 362/466 |
| 2003/0012031 A1* | 1/2003 | Kurita | B60Q 1/0683 362/524 |
| 2003/0067762 A1* | 4/2003 | Fukawa | B60Q 1/12 362/37 |
| 2003/0090905 A1* | 5/2003 | Uchida | B60Q 1/1415 362/465 |
| 2003/0112636 A1* | 6/2003 | Tomita | B60Q 1/0683 362/515 |
| 2003/0117810 A1* | 6/2003 | Nakazawa | B60Q 1/0683 362/515 |
| 2003/0123249 A1* | 7/2003 | Iwamoto | B60Q 1/0683 362/39 |
| 2006/0092653 A1* | 5/2006 | Tachiiwa | B60Q 1/0683 362/507 |
| 2006/0164852 A1* | 7/2006 | Mochizuki | F21S 48/1778 362/539 |
| 2006/0193143 A1* | 8/2006 | Ohira | B60Q 1/0035 362/473 |
| 2006/0291222 A1* | 12/2006 | Ando | B60Q 1/115 362/466 |
| 2009/0161380 A1* | 6/2009 | Narumi | B60Q 1/0683 362/529 |
| 2009/0225563 A1* | 9/2009 | Yamamoto | F21S 48/1109 362/519 |
| 2010/0124069 A1* | 5/2010 | Nomura | F21S 48/145 362/512 |
| 2010/0124070 A1* | 5/2010 | Ochiai | F21S 48/1145 362/512 |
| 2010/0238676 A1* | 9/2010 | Kikuchi | B60Q 1/0047 362/519 |
| 2011/0063866 A1* | 3/2011 | Shibata | B60Q 1/076 362/523 |
| 2011/0141752 A1* | 6/2011 | Nishitani | B60Q 1/0683 362/460 |
| 2011/0141753 A1* | 6/2011 | Tanaka | F21S 48/1778 362/464 |
| 2011/0192243 A1* | 8/2011 | Tachiiwa | B29C 45/0025 74/89.23 |
| 2011/0305033 A1* | 12/2011 | Sugiyama | B60Q 1/085 362/512 |
| 2013/0329441 A1* | 12/2013 | Ishikawa | H05K 5/0078 362/467 |

* cited by examiner

LAMP ADJUSTER TO CONTROL MARGINS

BACKGROUND

Some vehicle lamp assemblies are installed directly to the vehicle fascia. Later, near the end of the manufacturing process or sometimes in an aftermarket setting, the lamp assembly needs to be adjusted. Adjusting the lamp assembly can include changing an angle of the lamp assembly relative to the fascia. Doing so, however, creates gaps between the lamp assembly and the fascia since the margins between the lamp and fascia must be large enough to account for all possible aim conditions. The gaps can negatively affect the aesthetics of the vehicle.

DETAILED DESCRIPTION

An exemplary vehicle lamp assembly includes a body having a reflector, a lens, and a bulb. The assembly further includes a bezel, at least one adjuster arm attached to the body and to the bezel, and at least one biasing arm attached to the body and to the bezel. The biasing arm is configured to aim the reflector in accordance with movement of the adjuster arm while minimizing a gap between the bezel and the lens.

The lamp assembly shown in the FIGS. may take many different forms and include multiple and/or alternate components and facilities. While an exemplary vehicle is shown, the exemplary components illustrated are not intended to be limiting. Indeed, additional or alternative components and/or implementations may be used.

Figure 1:
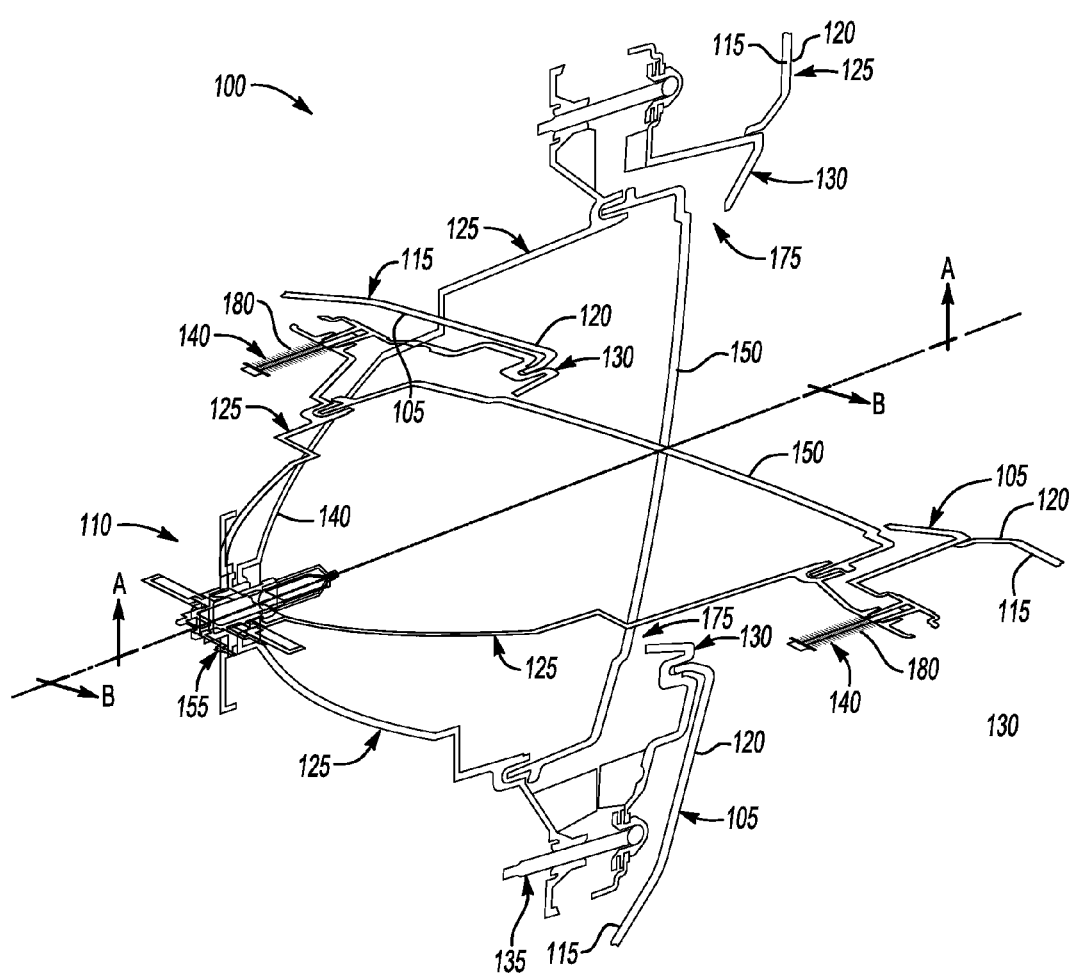
FIG. 1 illustrates a perspective view of an exemplary lamp assembly having adjuster arms and biasing arms for aiming the reflector while maintaining relatively small gaps between the lens and the bezel.

As illustrated in FIG. 1, a vehicle 100 includes a fascia 105 and a lamp assembly 110. The fascia 105 may refer to a cover located at the front and/or rear ends of the vehicle 100. The fascia 105 may be generally formed from a plastic material, and in some instances, the fascia 105 may have aesthetic qualities that define the shape of the front- and/or rear-ends of the vehicle 100. The fascia 105 may include an interior surface 115 and an exterior surface 120. The interior surface 115 may be generally hidden from ordinary view (i.e., inward-facing relative to the vehicle 100) while the exterior surface 120 may generally be outward-facing relative to the vehicle 100. Further, the fascia 105 may be used to hide certain parts of the vehicle 100, such as the bumper, from ordinary view. The fascia 105 may define various openings for, e.g., headlamps, a grille, tail lamps, fog lamps, etc.

The lamp assembly 110 may include a body 125, a bezel 130, at least one adjuster arm 135, and at least one biasing arm 140. The body 125 may be configured to house various components of the lamp assembly 110 including a reflector 145, a lens 150, and a bulb 155. The bulb 155 may be configured to generate light, and the reflector 145 may be configured to direct the light generated by the bulb 155 away from the vehicle 100. The lens 150 may be configured to focus the light generated by the bulb 155 and directed away from the vehicle 100 by the reflector 145. The lamp assembly 110 may be at least partially disposed on, e.g., the fascia 105.

Each adjuster arm 135 may be configured to rotate. For example, each adjuster arm 135 may include a bearing 160 that attaches to a socket 165 in the bezel 130 via, e.g., a ball joint (see FIG. 3). The adjuster arm 135 may further be threaded, and the threads of the adjuster arm 135 may be configured to mate with threads located on the bezel 130. The rotation of one adjuster arm 135 may cause the lamp assembly 110 to aim toward a road surface or away from the road surface as shown and discussed in greater detail below with regard to FIG. 4.

Each biasing arm 140 may be configured to aim the reflector 145 in accordance with movement of the adjuster arms 135, and specifically the rotation of the adjuster arms 135, while minimizing a gap 175 between the bezel 130 and the lens 150. As shown, each biasing arm 140 includes a spring 180 disposed on the body 125. The springs 180 are configured to bias the body 125 toward the bezel 130.

Figure 2:
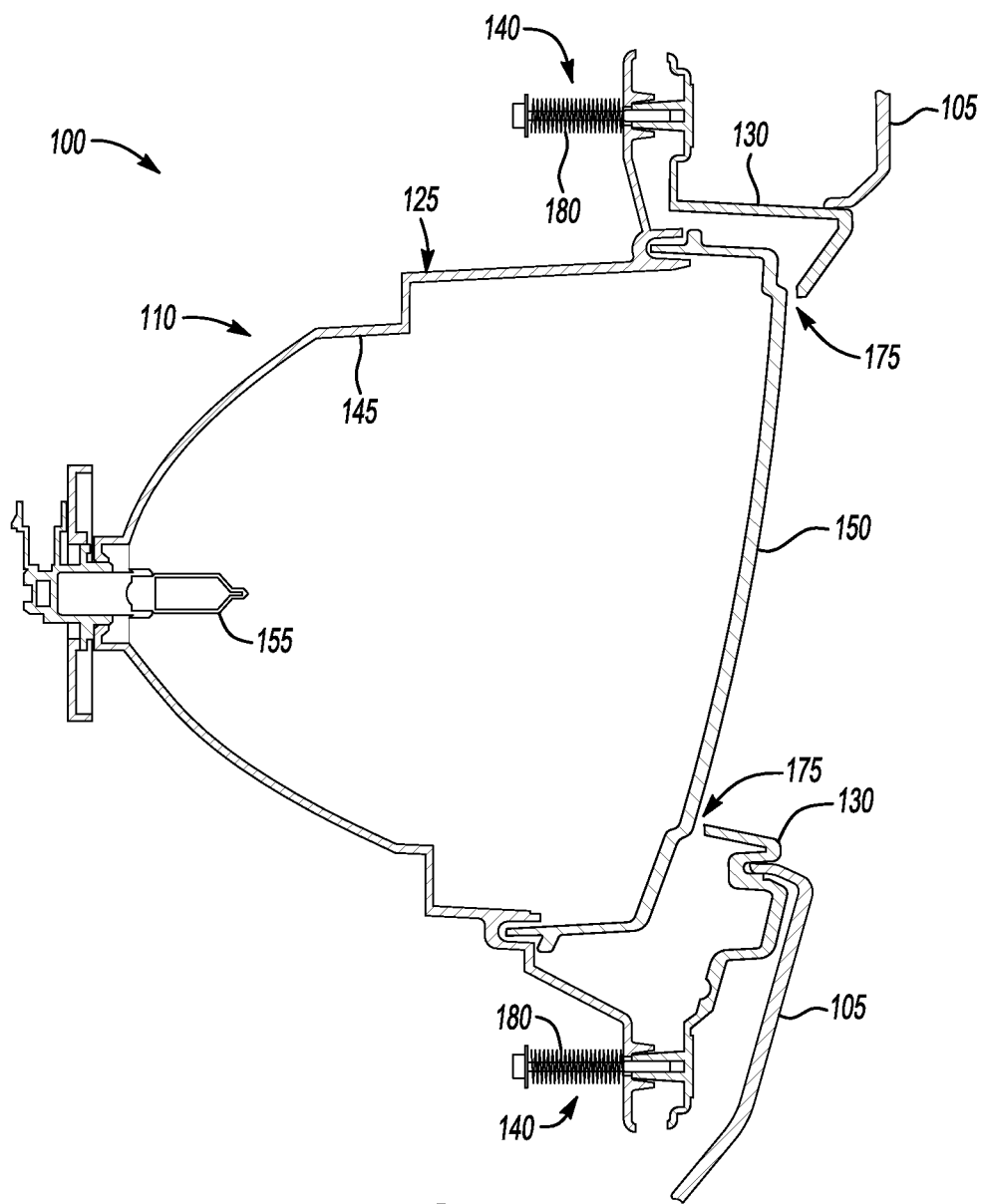
FIG. 2 is a cross-sectional view of the lamp assembly taken along the line A-A in FIG. 1 and illustrates the biasing arms.

FIG. 2 is a cross-sectional view of the lamp assembly 110 taken along the line A-A in FIG. 1. As shown in FIG. 2, the lamp assembly 110 includes two biasing arms 140 located on the body 125 on opposite sides of the reflector 145. The lamp assembly 110 of FIG. 2 is shown in a neutral position. As one of the adjuster arms 135 is rotated to push part of the body 125 away from the bezel 130, one or both biasing arms 140 will compress to minimize the change of the gap 175 between the lens 150 and the bezel 130 on a side of the body 125 opposite from the rotated adjuster arm 135, as shown and discussed below with reference to FIG. 4.

Figure 3:
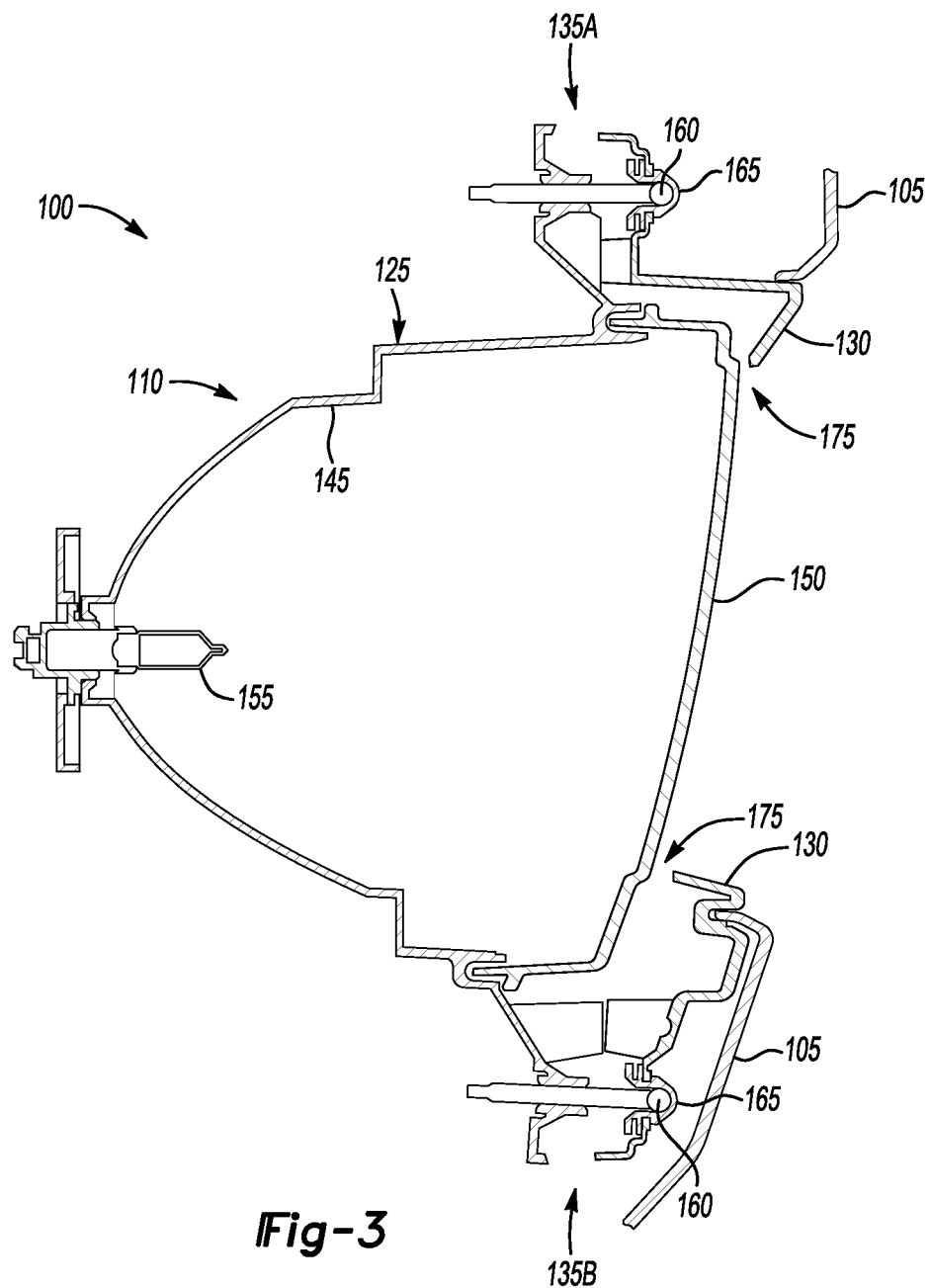
FIG. 3 is a cross-sectional view of the lamp assembly taken along the line B-B in FIG. 1 and illustrates the adjuster arms.

FIG. 3 is a cross-sectional view of the lamp assembly 110 taken along the line B-B in FIG. 1. The lamp assembly 110 includes two adjuster arms 135, a first adjuster arm 135A and a second adjuster arm 135B, disposed on opposite sides of the reflector 145. Both adjuster arms 135 have threads that mate with threads on the body 125. The rotation of one of the adjuster arms 135 may cause the lamp assembly 110 to rotate. For example, rotating the first adjuster arm 135A to aim the lamp assembly 110 away from the road may cause the lens 150 near the first adjuster arm 135A to move away from the bezel 130 and the lens 150 near the second adjuster arm 135B to have minimal movement in relation to the bezel 130 due, in part, to the biasing action of the springs 180 of the biasing arms 140. Similarly, rotating the second adjuster arm 135B to aim the lamp assembly 110 toward the road may cause the lens 150 near the second adjuster arm 135B to move away from the bezel 130 and the lens 150 near the first adjuster arm 135A to have minimal movement in relation to the bezel 130 due, in part, to the biasing action of the springs 180 of the biasing arms 140. Turning the adjuster arms 135 in the opposite directions would have the opposite effect.

Figure 4:
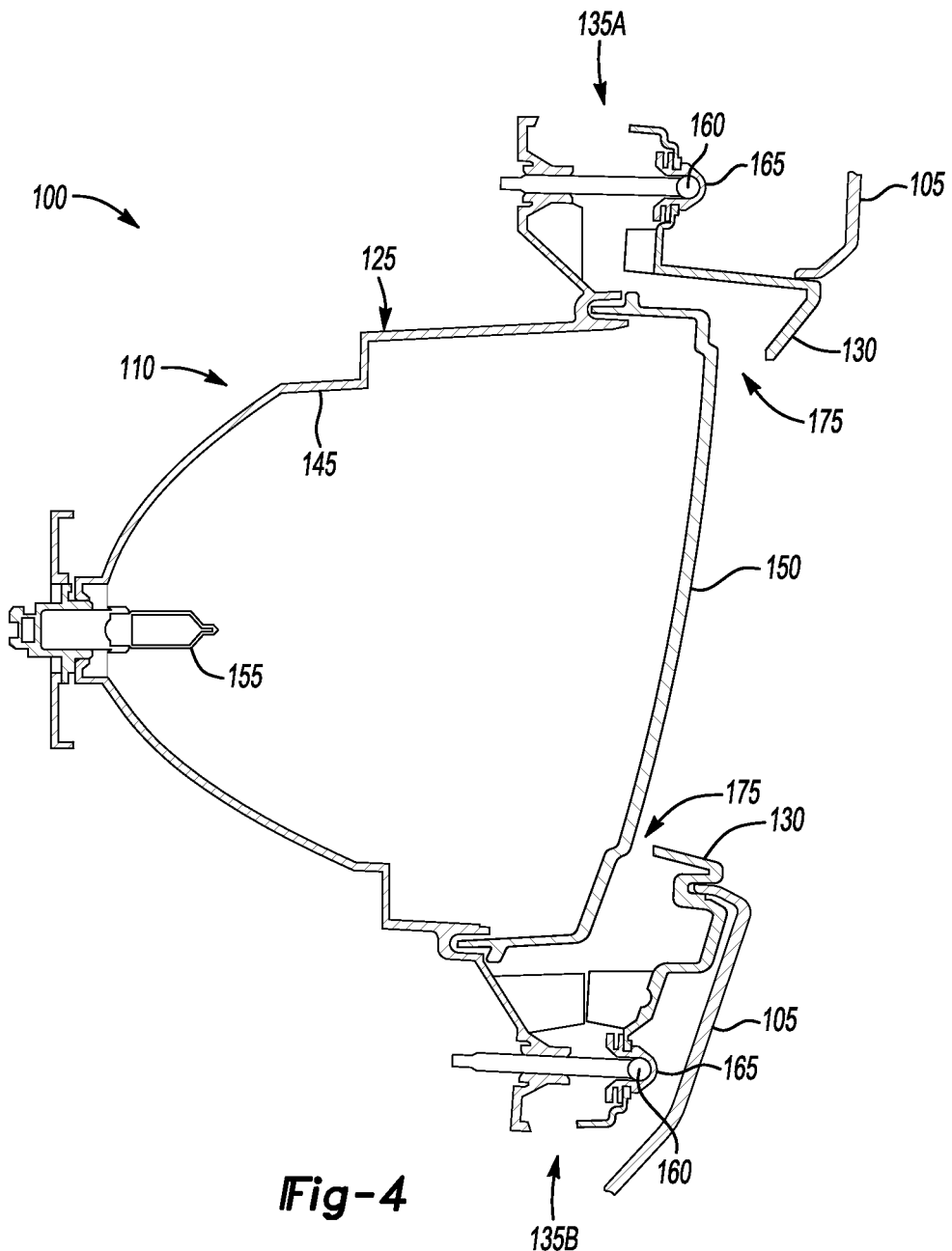
FIG. 4 is a cross-sectional view of the lamp assembly aimed away from a road surface.

FIG. 4 is a cross-sectional view of the lamp assembly 110 aimed away from a road surface (i.e., in a non-neutral position). As shown, the first adjuster arm 135A has been rotated to aim the lamp 110 and therefor increasing the size of the gap 175A between the part of the lens 150 near the first adjuster arm 135A and the bezel 130. The biasing force of the biasing arms 140 may cause the size of the gap 175B between the part of the lens 150 near the second adjuster arm 135B and the bezel 130 to minimally change. Moreover, as shown in FIG. 4, the rotation of the first adjuster arm 135A may cause the first adjuster arm 135A and/or the second adjuster arm 135B to rotate in the ball joint to accommodate the angle of the body 125 since the bezel 130 remains in a relatively fixed orientation despite the movement of the adjuster arms 135 and biasing force of the biasing arms 140.

The sizes of the gaps 175 illustrated in FIGS. 1-4 are exaggerated for purposes of illustrating how the rotation of the adjuster arms 135 affects the aim of the lamp assembly 110. When the lamp assembly 110 is in a neutral position, as shown in FIGS. 1-3, the gap 175 between the bezel 130 and the lens 150 is uniformly substantially zero (e.g., less than 0.5 mm). When the lamp assembly 110 is in a non-neutral position, as shown in FIG. 4, the gap 175 between the bezel 130 and the lens 150 is substantially zero on one side (nearest the adjuster arm 135 that was adjusted) and substantially non-zero on the other side (nearest the adjuster arm 135 that was not adjusted).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle lamp assembly comprising:
   a body including a reflector, a lens, and a bulb;
   a bezel;
   at least one-rotatable adjuster arm directly attached to the body and to the bezel;
   at least one biasing arm attached to the body and to the bezel, wherein the biasing arm is configured to aim the reflector in accordance with movement of the adjuster arm while minimizing a gap between the bezel and the lens.

2. The lamp assembly of claim 1, wherein the adjuster arm includes a bearing configured to attach to the bezel via a ball joint.

3. The lamp assembly of claim 1, wherein the biasing arm is configured to aim the reflector in accordance with the rotation of the adjuster arm.

4. The lamp assembly of claim 1, wherein the biasing arm includes a spring disposed on the body.

5. The lamp assembly of claim 1, wherein the at least one biasing arm includes a first biasing arm and a second biasing arm disposed on opposite sides of the reflector.

6. The lamp assembly of claim 1, wherein the at least one adjuster arm includes a first adjuster arm and a second adjuster arm disposed on opposite sides of the reflector.

7. The lamp assembly of claim 1, wherein the adjuster arm is configured to aim the reflector away from or toward a road surface in accordance with the movement of the adjuster arm.

8. A vehicle comprising:
   a fascia; and
   a lamp assembly disposed on the fascia, wherein the lamp assembly includes a body having a reflector, a lens, and a bulb, the lamp assembly further including a bezel, at least one rotatable adjuster arm directly attached to the body and to the bezel, and at least one biasing arm attached to the body and to the bezel,
   wherein the biasing arm is configured to aim the reflector in accordance with movement of the adjuster arm while minimizing a gap between the bezel and the lens.

9. The vehicle of claim 8, wherein the adjuster arm includes a bearing configured to attach to the bezel via a ball joint.

10. The vehicle of claim 8, wherein the biasing arm is configured to aim the reflector in accordance with the rotation of the adjuster arm.

11. The vehicle of claim 8, wherein the biasing arm includes a spring disposed on the body.

12. The vehicle of claim 8, wherein the at least one biasing arm includes a first biasing arm and a second biasing arm disposed on opposite sides of the reflector.

13. The vehicle of claim 8, wherein the at least one adjuster arm includes a first adjuster arm and a second adjuster arm disposed on opposite sides of the reflector.

14. The vehicle of claim 8, wherein the biasing arm is configured to aim the reflector away from or toward a road surface in accordance with the movement of the adjuster arm.

15. The vehicle of claim 8, wherein the gap between the bezel and the lens is substantially zero when the lamp assembly is in a neutral position.

16. The vehicle of claim 15, wherein at least one portion of the gap is substantially zero and another portion of the gap is substantially non-zero when the lamp assembly is in a non-neutral position.

17. A vehicle lamp assembly comprising:
   a body including a reflector, a lens, and a bulb;

a bezel;

a plurality of adjuster arms directly attached to the body and to the bezel, wherein each adjuster arm is configured to rotate;

a plurality of biasing arms attached to the body and to the bezel, wherein each biasing arm includes a spring disposed on the body and wherein each biasing arm is configured to aim the reflector in accordance with the rotation of the adjuster arms while minimizing a gap between the bezel and the lens.

* * * * *